Patented Mar. 4, 1941

2,233,873

UNITED STATES PATENT OFFICE 2,233,873

AZO DYESTUFF INTERMEDIATES

Maurice Arthur Thorold Rogers and Wilfred Archibald Sexton, Blackley, Manchester, England, assignors to Imperial Chemical Industries Limited, a corporation of Great Britain No Drawing. Application June 22, 1938, Serial No. 215,268. In Great Britain June 23, 1937

7 Claims. (Cl. 260—304)

This invention relates to the manufacture of new intermediate products for use in the manufacture of dyestuffs and to water insoluble azo dyestuffs made from the said intermediate products. More particularly the invention relates to the manufacture of arylene-thiazyl-methyl ketones, conveniently represented by the general formula:

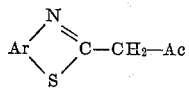

in which Ar stands for an o-arylene radical of the benzene or naphthalene series, substituted or not, but if substituted then not carrying groups inducing solubility in water (for example carboxylic or sulfonic acid groups); and in which Ac stands for a carboxylic acid radical of the aliphatic or aromatic series, for instance acetyl, benzoyl, nitro-benzoyl, and the like.

According to the invention the new arylene-thiazyl-methyl ketones are made by reducing under acid conditions o-o'-di(acyl-acetamido)di-aryl disulfides.

The raw compounds are insoluble in water but soluble in organic solvents and in aqueous solutions of caustic alkalies.

According to a further feature of the invention water insoluble azo dyestuffs are made by coupling a diazotized amine free from groups inducing solubility in water with the coupling components identified above, the coupling being carried out so that the azo compound is formed either in substance or on a sub-stratum (for instance, cotton fiber).

The so-obtained dyestuffs are yellow to orange in shade and have good fastness properties.

The invention is illustrated but not limited by the following examples, in which the parts are by weight.

Example I 30 parts of o:o'-di(acetoacetamido)diphenyl disulfide (prepared by heating o:o'-diamino-diphenyl disulfide with two molecular proportions of ethyl acetoacetate in chloro-benzene solution) are dissolved in 600 parts of glacial acetic acid, and the solution is heated to boiling. There are gradually added 30 parts of zinc dust. The solution is boiled for a short time after all the zinc dust is added and is then filtered while still hot, to remove any unchanged zinc.

The filtrate is then diluted with about 3000 parts of cold water, whereupon the desired product, namely 2-acetonyl-benthiazole, separates in crystalline form. It is filtered off, washed with water and dried. It may be crystallized from ethyl alcohol, and then forms colorless plates, M. P. 120° C.

Instead of 2:2'-di(acetoacetamido)diphenyl disulfide as initial material, other 2-(acylacetamido)diaryl sulfides may be used. For example, from the disulfides given in the first column of Table 1, the thiazyl-methyl ketones in column 2 are obtained and may be similarly employed for the production of coloring matter according to the invention.

Table 1

| 2-(acylacetamido)diaryl disulfide | Arylene-thiazyl-methyl ketones |
|---|---|
| $H_5C_2O-\langle\rangle-S-S-\langle\rangle-OC_2H_5$, with —NH NH—, CO CO, CH$_2$ CH$_2$, CO CO, CH$_3$ CH$_3$ <br> M. P. 134–135° C. | $H_5C_2O-\langle\rangle\overset{N}{\underset{S}{\diagdown}}C-CH_2-COCH_3$ <br> M. P. 104° C. |

Table 1—Continued

| 2-(acylacetamido)diaryl disulfide | Arylene-thiazyl-methyl ketones |
|---|---|
| Cl—⟨benzene⟩—S—S—⟨benzene⟩—Cl, with —NH—CO—CH₂—CO—CH₃ and CH₃ substituents<br>M. P. 174–177° C. | ⟨benzene with CH₃ and Cl⟩—N=C(—CH₂COCH₃)—S (thiazole ring)<br>M. P. 101–102° C. |
| Cl—⟨benzene⟩—S—S—⟨benzene⟩—Cl, with —NH—CO—CH₂—CO—CH₃ substituents<br>M. P. 168–169° C. | Cl—⟨benzene⟩—N=C(—CH₂—COCH₃)—S (thiazole ring)<br>M. P. 142–144° C. |

Example II 10 parts of acetonyl-benzthiazole are mixed with 20 parts of Turkey red oil, 250 parts of boiling water are added, followed by 20 parts of aqueous caustic soda 60° Tw. The clear solution is diluted with cold water to make 1000 parts by volume.

Cotton cloth is impregnated with the above solution, dried, and developed by immersion in a bath made as follows:

10 parts of 4-chloro-2-methyl-aniline hydrochloride are dissolved in 200 parts of cold water containing 10 parts of hydrochloric acid 32° Tw.

The solution is cooled to 12° C. and 4 parts of sodium nitrite dissolved in 20 parts of cold water are slowly added.

After standing for 30 minutes the solution is made neutral to Congo red indicator paper by the addition of about 7.5 parts of sodium acetate dissolved in 15 parts of cold water.

10 parts of acetic acid 50% are then added and the solution diluted with 750 parts of water.

After development the fabric is rinsed in cold water.

Any other diazotized primary arylamine may be substituted for diazotized 4-chloro-2-methyl-aniline.

As many apparently widely different embodiments of this invention may be made without departing from the spirit and scope thereof, it is to be understood that we do not limit ourselves to the specific embodiments thereof except as defined in the appended claims.

We claim:

1. The compounds represented by the formula

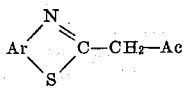

in which Ar is an o-arylene radical of the class consisting of the benzene and naphthalene series, not having COOH or SO₃H as substituents, and Ac is acyl.

2. A compound represented by the formula

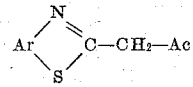

in which Ar is a radical of the benzene series which is devoid of solubilizing groups and to which N and S are connected in adjacent positions of the radical, and Ac is acyl.

3. A compound represented by the formula

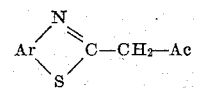

in which Ar is a radical of the benzene series which is devoid of solubilizing groups and to which N and S are connected in adjacent positions of the radical, and Ac is acetyl.

4. The compound represented by the formula

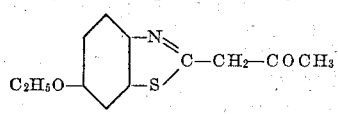

5. The compound represented by the formula

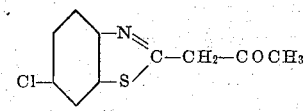

6. The compound represented by the formula

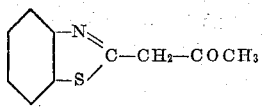

7. The process which comprises reducing under acid conditions an o-o'-di(acyl-acetamido)diaryl disulfide until an arylenethiazylmethyl ketone is formed.

MAURICE ARTHUR THOROLD ROGERS.
WILFRED ARCHIBALD SEXTON.